Jan. 8, 1924.
C. EBERHART, JR
1,480,518
HOOD FASTENER FOR AUTOMOBILES
Filed Dec. 29, 1921    2 Sheets-Sheet 1
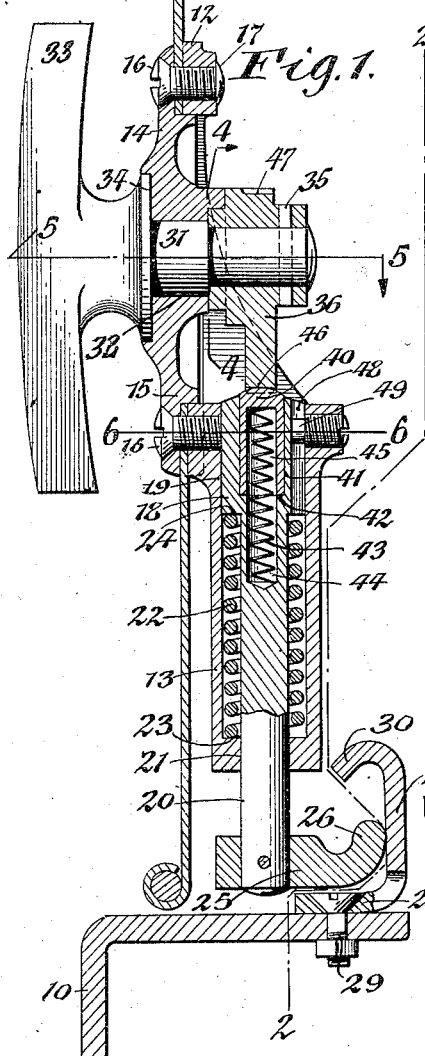
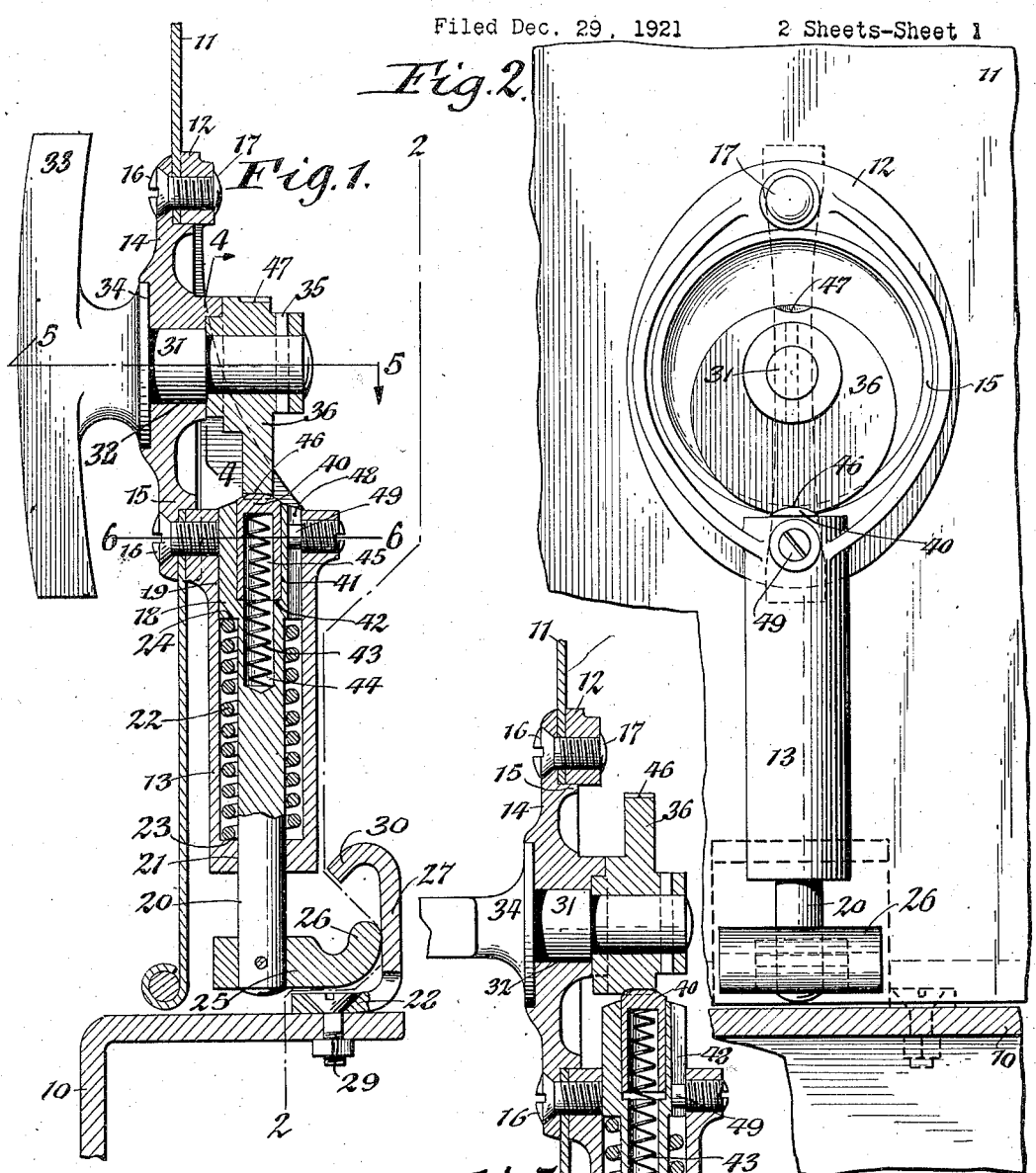
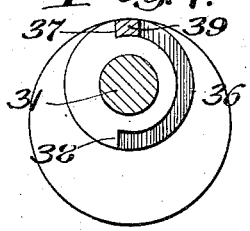
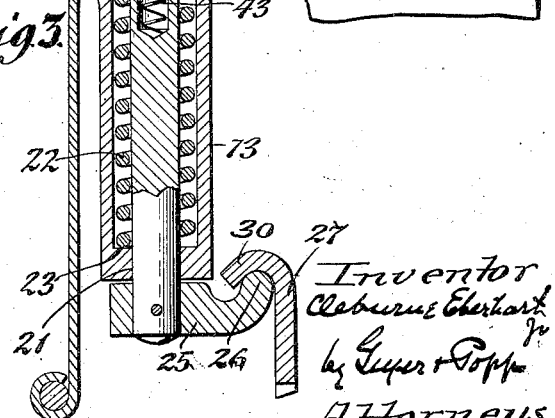

Jan. 8, 1924.                                                1,480,518
C. EBERHART, JR
HOOD FASTENER FOR AUTOMOBILES
Filed Dec. 29, 1921                 2 Sheets-Sheet 2
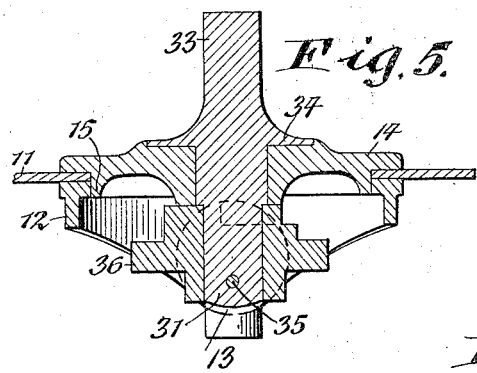
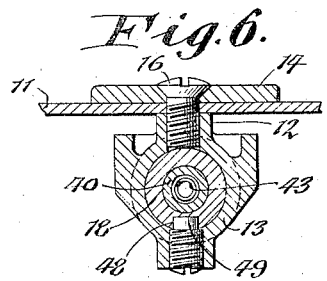
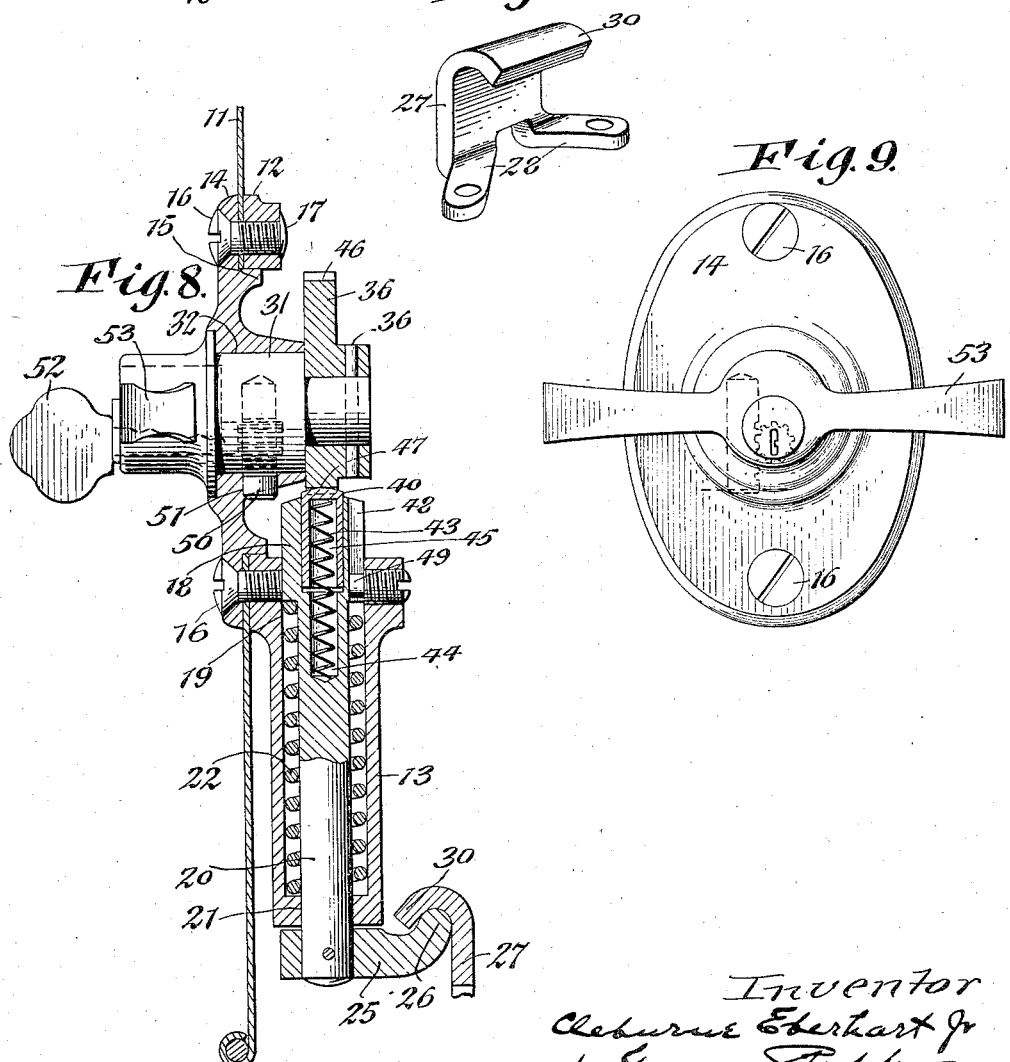

Patented Jan. 8, 1924.

1,480,518

UNITED STATES PATENT OFFICE.

CLEBURNE EBERHART, JR., OF BUFFALO, NEW YORK.

HOOD FASTENER FOR AUTOMOBILES.

Application filed December 29, 1921. Serial No. 525,542.

*To all whom it may concern:*

Be it known that I, CLEBURNE EBERHART, Jr., a citizen of the United States, residing in the city of Buffalo, in the county of Erie and State of New York, have invented new and useful Improvements in Hood Fasteners for Automobiles, of which the following is a specification.

This invention relates to a fastener for connecting the hood of an automobile with the frame of the same and more particularly to a fastener of this character which has its main elements arranged on the inner side of the hood so that the same are concealed from view and thus not only improve the appearance of the automobile, but also enable the hood to be kept clean more readily.

It is the object of this invention to provide a fastener of this class which permits of coupling the hood and frame of the automobile easily, conveniently and reliably, also to so construct the same that none of the parts are liable to become displaced and rattle, and also to so organize this fastener that the same may be securely locked and thus prevent opening of the hood by unauthorized persons.

In the accompanying drawings: Figure 1 is a fragmentary vertical transverse section of the frame and hood of an automobile equipped with one form of my invention and showing the parts in an unlocked position. Figure 2 is a vertical longitudinal section of the same taken on line 2—2, Fig. 1 and looking outwardly. Figure 3 is a fragmentary view similar to Fig. 1, but showing the parts in a locked position. Figure 4 is a vertical longitudinal section taken on line 4—4, Fig. 1. Figures 5 and 6 are horizontal sections taken on the correspondingly numbered lines in Fig 1. Figure 7 is a perspective view of the relatively stationary hook of the fastener which is mounted in the frame of the automobile. Figure 8 is a fragmentary vertical transverse section of the hood of an automobile showing a fastener of my invention associated therewith, but of a form differing slightly from that shown in Figs. 1 and 3. Figure 9 is a front elevation of the face plate, handle and associated parts of the fastener shown in Fig. 8.

Similar characters of reference refer to like parts throughout the several views.

10 represents one of the side bars or sills of an automobile and 11 one of the movable side walls of the hood which is normally arranged vertically above this frame bar and serves to enclose the engine and other parts of the automobile which are mounted on the adjacent part of the main frame.

My improved fastener for detachably connecting this hood with the frame of the automobile comprises a support which in its preferred form, as best shown in Figs. 1–3, consists of a circular rim 12 arranged on the inner side of the hood 11 around an opening in the latter, a tubular guide 13 projecting downwardly from the lower part of this rim along the inner side of the hood, and a face plate 14 engaging with the outer side of the hood in line with the rim 12 and provided with an inwardly projecting annular flange 15 which projects through the opening in the hood and fits into the bore of the rim 12, as shown in Figs. 1, 2, 3 and 5. The circular rim 12 and the tubular guide 13 are preferably formed integrally by casting or otherwise and in effect constitute a bracket which supports parts of the fastener on the inner side of the hood. This face plate and rim may be connected with each other and with the hood in any suitable manner, for instance, by means of screws 16 passing through the upper and lower parts of the face plate and rim and the adjacent part of the hood from the outer side of the hood, the upper screw 16 being preferably upset or riveted over its inner end as shown at 17, so as to prevent easy detachment of this frame from the hood.

Sliding vertically in the guide tube 13 is a shifting rod or plunger having an upper enlarged part 18 which is guided in the upper enlarged part 19 of the guide tube and a reduced lower part 20 which slides in a reduced guideway 21 on the lower part of the guide tube. This shifting rod is yieldingly held in its elevated position by means of a spring 22 arranged between the reduced part of the shifting rod and the bore of the guide tube and resting at its lower end on an upwardly facing shoulder 23 formed within the lower part of the guide tube while its other end bears against a downwardly facing shoulder 24 formed on the shifting rod between its upper enlarged and lower reduced parts, as shown in Figs. 1 and 3. At its lower end and below the guide tube the shifting rod is provided with a coupling hook 25 which has its bill or beak 26 arranged on the inner side of the shifting rod facing or projecting upwardly. Adjacent to the inner side of the shifting rod and the hook 25 which is vertically movable therewith is arranged a stationary coupling hook 27 which has its base 28 at the lower end thereof secured to the top of the frame by means of a bolt 29, or otherwise, while the beak 30 thereof projects or faces inwardly and downwardly so as to overhang the beak 26 of the movable coupling hook. In the normal or coupled position of these hooks, the movable hook is elevated so that the beak of the same engages or interlocks with the beak of the stationary hook, as shown in Fig. 3, thereby securing the hood to the frame so that the same covers the engine and associated parts mounted on the latter within the hood. Upon depressing the shifting rod together with the movable hook so that the coupling hooks are detached from each other, as shown in Fig. 1, the hood is uncoupled from the frame and is free to be lifted, so as to uncover the engine and associated parts and permit of access thereto.

Means are provided for depressing this shifting rod and movable hook from the exterior of the hood, which means are preferably combined with detent devices which operate to prevent the parts from rattling or becoming displaced. These means in their preferred form comprise a horizontal shaft 31 which passes transverse through a bearing 32 formed centrally in the face plate 14 and is journaled therein so as to be capable of turning in a vertical plane and provided at its outer end with a handle 33 whereby this shaft may be manipulated from the exterior of the hood, the hub 34 of this handle engaging with the outer side of the face plate, so as to limit the inward movement of the shaft relative to this plate. On its inner end the shaft 31 has secured thereto by a pin 35 a cam 36 which abuts against the innner end of the bearing 32 of the face plate and is arranged over the upper end of the shifting rod 20. Upon turning this cam by means of the handle 33 so that the salient portion of its face is lowermost, the shifting rod 20 will be depressed and the beak of the movable hook 25 will be disengaged from that of the stationary hook 27 and thereby disconnect the hood from the main frame, this position of the cam being indicated in Figs. 1 and 2. Upon turning this cam so that the innermost part of its face is lowermost the shifting rod is permitted to rise under the action of its spring 22 and engage the movable hook with the stationary hook, as shown in Fig. 3 and thereby fasten the hood upon the main frame. This rotary motion of the cam is preferably limited in opposite directions so that the same can only turn a half revolution and come to rest with the handle arranged in a horizontal position when the hood is fastened to the frame, as shown in Fig. 3 and so that the handle is in a vertical position when the hood is unfastened from the frame, as shown by full lines in Fig. 1 and by dotted lines in Fig. 2.

The stop device for this purpose preferably consists of reducing the outer end of the hub of the cam on one side so as to form stops or shoulders 37, 37 circumferentially on substantially diametrically opposite sides of the axis of the cam, which shoulders are adapted to engage respectively with opposite sides of a stop lug 39 on the inner end of the bearing 32 of the face plate, as shown in Figs. 1 and 4.

Instead of transmitting the motion of the cam directly to the shifting rod 20, this motion is transmitted indirectly by means which operate to produce a frictional engagement with the cam at all times and thus prevent the cam and handle from being displaced accidentally by jarring or otherwise when either in its fastened or unfastened condition of the hood. For this purpose a detent device is provided which in its preferred form, consists of a vertically movable detent dog or plunger 40, which slides in a guideway 41 in the upper part of the shifting rod 20 and is adapted to engage its upper end with the peripheral face of the cam, while its lower end is adapted to engage with an upwardly facing shoulder 42 in the bore of the shifting rod. This dog is yieldingly held in its elevated position by means of a spring 43 arranged within registering cavities 44, 45 in the shifting rod and engaging at its lower end with the top of the cavity of the dog, while its lower end bears against the bottom of the cavity in the shifting rod, as shown in Figs. 1 and 3. When turning the cam in the direction for moving the highest or outermost part of its face toward the dog 40, the latter will be depressed until its lower end engages with the shoulder 42 of the shifting rod after which this rod and dog form practically one piece and will move in unison with each other in a downward direction during the continued movement of the cam in this direction until the highest part of the face of this cam engages with the dog, whereby the movable hook will be disengaged from the stationary hook and the hood detached from the frame. Upon reversing the movement of the cam the shifting rod and dog are elevated in unison by means of the spring 22 until the movable hook engages with the stationary hook and thereafter the dog 40 will be moved upwardly by the spring 41 independently of the shifting rod and held in engagement with the peripheral face of the cam 36 until the innermost part of the face of the cam is in engagement with the dog, as shown in Fig. 5. By this means any slack between the shifting rod and the cam is taken up after the movable hook engages with the stationary hook before the cam has completed its backward motion thereby preventing any looseness or slackness between the parts which otherwise would cause the hood to rattle when the automobile is in operation. On the highest or outermost part of the face of the cam the same is provided with a notch 46 and a notch 47 is formed in the innermost part of the face of this cam which notches are adapted to be engaged by the dog 40 at opposite extremities of its rotary movement and thereby yieldingly hold the cam, shaft and handle in the position in which the handle stands vertically when the hood is detached from the frame and horizontally when the hood is attached to the frame, thereby always maintaining the good appearance of the car from the exterior of the hood.

In order to always maintain the movable hook in its proper relation to the stationary hook, means are provided for preventing the shifting rod from turning, which means in the present instance, consists in providing the upper enlarged part of the shifting rod with a longitudinal groove 48 which is engaged by a spline 49 having preferably the form of a screw which works in a threaded opening in the threaded part of the tubular guideway, as shown in Figs. 1, 2, 3 and 6.

If desired, means may be associated with this hood fastener whereby the same may be locked when the parts are in such position that the hood is coupled with the frame. In the preferred construction of the locking means for this purpose which are shown in the drawings, consists of a vertically movable locking bolt 50 which is adapted to move into and out of engagement with a radial notch or recess 51 in the bearing 32 of the shaft 31 and which forms part of a lock mechanism arranged within the shaft 31 and adapted to be operated by means of a key 52 entering this lock mechanism from the front end of the handle 53, as shown in Figs. 8 and 9. When this locking bolt 50 is retracted from the opening 51 the shaft 31 may be turned by the handle 53 for engaging the movable coupling hook with or disengaging the same from the stationary hook, but when the locking bolt is engaged with the recess 51 turning of the shaft 31 is prevented.

This locking mechanism is preferably so organized that the key 52 can not be withdrawn therefrom, excepting when the movable coupling hook is in engagement with the stationary coupling hook, thereby always insuring fastening of the hood to the frame when the key has been withdrawn from the locking mechanism while the hood is in its proper position relative to the frame.

This hood fastener is compact in construction and capable of being applied to the inner side of the hood and the adjacent part of the frame without encroaching upon the space usually required for other mechanism, the same is strong and durable and not liable to get out of order, the same can be operated very easily and conveniently and none of the several parts are liable to become loose and produce a rattling noise.

I claim as my invention:

1. A fastener for automobile hoods, comprising a bracket adapted to be arranged on the inner side of the hood and provided with a vertical tubular guide having an upwardly facing internal shoulder, a shifting rod sliding in said guide and having a downwardly facing external shoulder, a spring arranged between said tubular guide and rod and engaging its opposite ends with the shoulders thereof and tending to raise said rod, a cam adapted to be pivotally mounted on the hood and to depress said rod, an upwardly facing hook arranged on said rod and a downwardly facing hook adapted to be engaged by said upwardly facing hook and to be mounted on the automobile frame within said hood.

2. A fastener for automobile hoods, comprising a bracket adapted to be arranged on the inner side of the hood and provided with a vertical tubular guide having an upwardly facing internal shoulder, a shifting rod sliding in said guide and having a downwardly facing external shoulder, a spring arranged between said tubular guide and rod and engaging its opposite ends with the shoulders thereof and tending to raise said rod, a cam adapted to be pivotally mounted on the hood and to depress said rod, an upwardly facing hook arranged on said rod, a downwardly facing hook adapted to be engaged by said upwardly facing hook and to be mounted on the automobile frame within said hood, a plate adapted to be mounted on the hood and provided with a bearing, and a shaft journaled in said bearing and carrying said cam.

3. A fastener for automobile hoods comprising a bracket adapted to be arranged on the inner side of the hood and having an upper rim which is secured to the hood and a tubular guide projecting downwardly from said frame and having an upwardly facing shoulder, a shifting rod sliding in said tubular guide and having a downwardly facing shoulder, a spring for raising said rod interposed between said shoulders, a face plate adapted to be secured to the outer side of the hood in line with said rim and having a bearing, a shaft journaled in said bearing, a handle arranged on the outer end of said shaft, a cam arranged on the inner end of said shaft and adapted to depress said rod, an upwardly facing hook arranged on said rod, and a downwardly facing hook adapted to be arranged on the automobile frame and to be engaged by said upwardly facing hook.

4. A fastener for automobile hoods comprising a bracket adapted to be arranged on the inner side of the hood and having an upper rim which is secured to the hood and a tubular guide projecting downwardly from said frame and having an upwardly facing shoulder, a shifting rod sliding in said tubular guide and having a downwardly facing shoulder, a spring for raising said rod interposed between said shoulders, a face plate adapted to be secured to the outer side of the hood in line with said rim and having a bearing, a shaft journaled in said bearing, a handle arranged on the outer end of said shaft, a cam arranged on the inner end of said shaft and adapted to depress said rod, an upwardly facing hook arranged on said rod, a downwardly facing hook adapted to be arranged on the automobile frame and to be engaged by said upwardly facing hook, and co-operating stops arranged on said cam and face plate for limiting the rotary movement of the cam in both directions.

5. A fastener for automobile hoods comprising a reciprocating shifting rod adapted to be mounted on the hood, a movable hook arranged on said rod, a stationary hook adapted to be arranged on the automobile frame and to be engaged by said movable hook, a spring for moving said rod in the direction to engage said hooks, a rotary cam adapted to be mounted on the hood and to shift said rod in the direction for disengaging said hooks, and detent means interposed between said shifting rod and cam.

6. A fastener for automobile hoods comprising a reciprocating shifting rod adapted to be mounted on the hood, a movable hook arranged on said rod, a stationary hook adapted to be arranged on the automobile frame and to be engaged by said movable hook, a spring for moving said rod in the direction to engage said hooks, a rotary cam adapted to be mounted on the hood and to shift said rod in the direction for disengaging said hooks, and provided on diametrically opposite sides of its periphery with notches, a detent dog slidable lengthwise on said rod and adapted to engage said notches in the periphery of said cam, and a spring interposed between said rod and dog and operating to hold the latter yieldingly in engagement with the periphery of said cam.

7. A fastener for hoods of automobiles, comprising a guide adapted to be mounted on the inner side of a hood, a shifting rod sliding in said guide, a cam mounted on the hood and adapted to shift said rod, a movable hook arranged on said rod, a stationary hook adapted to be mounted on the frame of the automobile within the hood and to be engaged by said movable hook, and means for preventing said rod from turning in said guide consisting of a spline arranged on the guide and engaging with a longitudinal groove in such shifting rod.

8. A fastener for automobile hoods comprising a bracket adapted to be arranged on the inner side of the hood and having an upper rim which is secured to the hood and a tubular guide projecting downwardly from said frame and having an upwardly facing shoulder, a shifting rod sliding in said tubular guide and having a downwardly facing shoulder, a spring for raising said rod interposed between said shoulders, a face plate adapted to be secured to the outer side of the hood and fitting into said rim and having a bearing, a shaft journaled in said bearing, a handle arranged on the outer end of said shaft, a cam arranged on the inner end of said shaft and adapted to depress said rod, an upwardly facing hook arranged on said rod, and a downwardly facing hook adapted to be arranged on the automobile frame and to be engaged by said upwardly facing hook.

9. A fastener for automobile hoods comprising a bracket adapted to be arranged on the inner side of the hood and having an upper rim which is secured to the hood and a tubular guide projecting downwardly from said frame, and having an upwardly facing shoulder, a shifting rod sliding in said tubular guide and having a downwardly facing shoulder, a spring for raising said rod interposed between said shoulders, a face plate adapted to be secured to the outer side of the hood in line with said rim and having a bearing, a shaft journaled in said bearing, a handle arranged on the outer end of said shaft, a cam arranged on the inner end of said shaft and adapted to depress said rod, an upwardly facing hook arranged on said rod, a downwardly facing hook adapted to be arranged on the automobile frame and to be engaged by said upwardly facing hook, and means for locking said cam against turning comprising a locking bolt slidable laterally on said shaft into and out of engagement with an opening in said face plate, and a lock mechanism mounted on the shaft for operating said bolt.

CLEBURNE EBERHART, JR.